2,876,895

RELEASE AGENTS FOR PRESSURE-SENSITIVE ADHESIVES

William S. Port, Norristown, and Edmund F. Jordan, Jr., Philadelphia, Pa., assignors to the United States of America as represented by the Secretary of Agriculture No Drawing. Original application February 26, 1953, Serial No. 339,189. Divided and this application June 5, 1956, Serial No. 597,057

2 Claims. (Cl. 206—59)

(Granted under Title 35, U. S. Code (1952), sec. 266)

A non-exclusive, irrevocable, royalty-free license in the invention herein described, throughout the world for all purposes of the United States Government, with power to grant sublicenses for such purposes, is hereby granted to the Government of the United States of America.

This application is a division of Serial No. 339,189, filed February 26, 1953, now abandoned.

This invention pertains to pressure-sensitive adhesives, and particularly to release agents for such adhesives.

An object of this invention is to provide compositions useful as release agents for pressure-sensitive adhesives. Another object is to provide a material useful for coating the non-adhesive side of tapes coated with pressure-sensitive adhesives.

By release agents we mean materials to which the adhesive does not adhere strongly and from which the adhesive separates easily and cleanly.

By pressure-sensitive adhesives we mean adhesives that readily adhere to most surfaces when applied with light pressure and without application of heat, moisture or other agents. Such adhesives are widely used in the form of adhesive tapes wherein the adhesive composition is applied to one side of a ribbon of paper, fabric or flexible plastic and the tape is then wound into a compact roll, as on a reel, spool or other form. The production of a useful tape in such roll form requires that the adhesive composition not adhere strongly to the back of the tape; yet it must adhere strongly to the front surface to which it is applied. This differential in adhesion to the front and back, respectively, is attained by using a tape material to which the adhesive adheres strongly or by using an undercoat which binds the pressure-sensitive coating to the tape, and at the same time using a coating on the back side of the tape such that the pressure-sensitive adhesive does not adhere strongly and releases cleanly and readily.

It may be readily appreciated that the properties required of the release agent used for coating the non-adhesive side of adhesive tapes are highly critical and no entirely satisfactory material has been found.

We have discovered that certain copolymers of long-chain vinyl esters are highly useful as release agents for pressure-sensitive adhesive tapes. When applied to the back of conventional paper, fabric or plastic tapes they form a firm, smooth, glossy, non-tacky surface to which the conventional pressure-sensitive adhesives adhere only slightly and from which such adhesives readily and cleanly separate when pulled away.

Our release agents are copolymers of vinyl esters of long-chain fatty acids with vinyl chloride or maleic anhydride. The preferred vinyl esters are those of the saturated fatty acids having 12 to 18 carbon atoms, as for instance, vinyl laurate, myristate, palmitate or stearate. The copolymers should contain about 20 to 80% of the vinyl ester copolymerized therein, since less than 20% yields a resin that is undesirably hard while more than 80% produces a product that does not have the desired release properties.

In the copolymerization of vinyl esters of fatty acids with vinyl chloride, the polymer is usually somewhat richer in vinyl chloride than was the mixture of monomers used. This is because of the higher activity of the monomeric vinyl chloride and can be compensated for by using a slightly higher proportion of monomeric vinyl ester than is desired in the copolymer.

Maleic anhydride has a strong tendency to copolymerize with vinyl esters in a molar ratio of 1:1, and ratios higher than this cannot be achieved. It so happens that this 1:1 ratio is about the optimum one for our purpose so it is the one we generally use. However, lower ratios can be achieved and are useful for our purpose.

The copolymers useful for our purpose may be prepared by any conventional polymerization procedure. We prefer to polymerize those mixtures containing vinyl chloride by use of the aqueous dispersion technique while for those containing maleic anhydride we prefer to conduct the polymerization in a suitable organic solvent. These techniques are well known in the art and are illustrated by the following examples.

*Example I*

A mixture of 72 g. of vinyl stearate, 128 g. of vinyl chloride, 0.126 g. of benzoyl peroxide and 400 ml. of a 1% aqueous solution of sodium dioctylsulfosuccinate was maintained at 50° C. and shaken continuously for 48 hours. The crude copolymer was filtered out, washed with water and dried. Emulsified copolymer was precipitated from the filtrate by addition of salt and was washed, dried and combined with the main portion. The copolymer was then extracted four times with 2 liters of boiling methanol and dried. The yield was 87% and the product contained 38.8% chlorine; hence the vinyl chloride content was 67%.

*Example II*

A mixture of 125 g. of vinyl stearate, 75 g. of vinyl chloride, 0.152 g. of benzoyl peroxide and 400 ml. of 1% aqueous sodium dioctylsulfosuccinate were heated and stirred as in Example I. The product, similarly recovered, was obtained in 77% yield and contained 25.5% chlorine; hence it contained 45% vinyl chloride.

*Example III*

A solution of 124.2 g. of vinyl stearate, 39.2 g. of maleic anhydride and 0.48 g. of benzoyl peroxide in 163.4 g. of benzene was heated for 4 hrs. at 70° C. The solution was then diluted to 600 ml. with benzene and 210 ml. of this solution was poured into 1250 ml. of acetone. The solid polymer thus precipitated was filtered out, washed with acetone and dried in vacuum, thus yielding 49 g. of copolymer (86% yield).

*Example IV*

The process of Example I was repeated except that 77.4 g. of vinyl laurate, 122.6 g. of vinyl chloride and 0.217 g. of benzoyl peroxide were used. The yield of copolymer was 95% and it contained 37.0% chlorine, which corresponds to 65% of vinyl chloride.

Sheets of the copolymers of Examples I to IV were prepared by molding in a hot press or by dissolving the resin in a suitable solvent and casting a film on a glass plate. The sheets and films were tough, flexible and non-tacky and substantially colorless.

Strips of commercial pressure-sensitive adhesive tape were firmly pressed onto the sheets and films of our release agents and then were pulled away. Only slight force was required to remove them and in every case they came away cleanly, leaving no adhesive on the release agent and retaining none of the release agent on the adhesive. Furthermore, the tackiness of the adhesive was unimpaired and none was imparted to the release agent. The same results were obtained when the adhesive tape strips were left on the sheets and films for one week before removing them.

In addition to the vinyl esters used in the above examples we can use the vinyl ester of other saturated fatty acids such as myristic or palmitic acids. The particular method of conducting the copolymerization is immaterial and any known method may be used. Thus, various catalysts, solvents, emulsifiers, temperatures and concentrations of materials may be used without appreciably changing the suitability of the product for our purposes.

We claim:

1. A roll of adhesive tape in which one side of the tape is coated with a pressure-sensitive adhesive and the other side is coated with a release agent comprising a copolymer of maleic anhydride and a vinyl ester of a saturated fatty acid having from 12 to 18 carbon atoms, said copolymer containing about from 20 to 80% of the said vinyl ester copolymerized therein.

2. A roll of adhesive tape in which one side of the tape is coated with a pressure-sensitive adhesive and the other side is coated with a release agent comprising a copolymer of maleic anhydride and vinyl stearate, said copolymer containing about 76% of the vinyl stearate copolymerized therein.

References Cited in the file of this patent

UNITED STATES PATENTS

| | | |
|---|---|---|
| 2,160,375 | Voss | May 30, 1939 |
| 2,548,980 | Kelgren | Apr. 17, 1951 |
| 2,562,852 | Baer | July 31, 1951 |

OTHER REFERENCES

Schildknecht: Vinyl and Related Polymers, Wiley & Sons (1952), pages 375–381. (Copy in Scientific Library.)